Nov. 20, 1962    F. R. WILHELM ETAL    3,064,681
HYDRAULIC CONTROL SYSTEM AND HYDRAULIC CONTROL VALVE THEREFOR
Filed Dec. 9, 1959    5 Sheets-Sheet 3

INVENTORS
FRED R. WILHELM,
EDMUND GREGORCZIK AND
HENRY L. MEYER
BY
Teare, Kramer, Sturges & Fetzer
ATTORNEYS

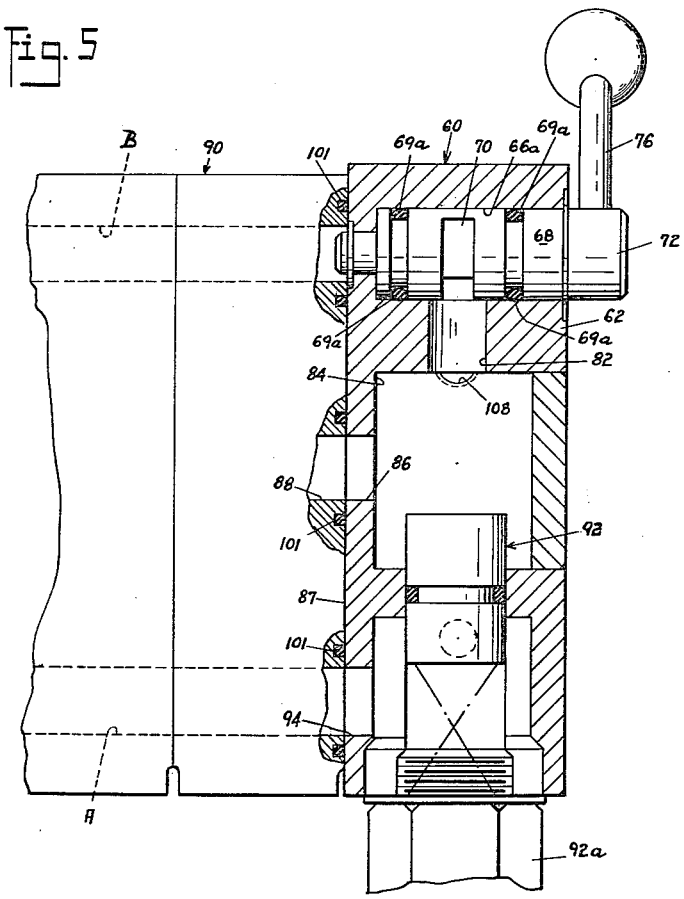
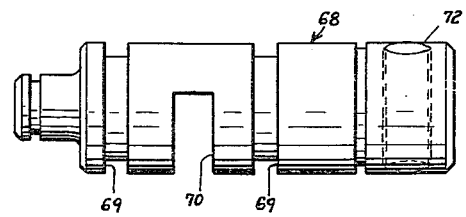
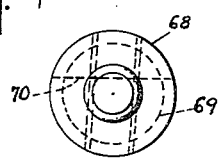

Nov. 20, 1962 F. R. WILHELM ETAL 3,064,681
HYDRAULIC CONTROL SYSTEM AND HYDRAULIC CONTROL VALVE THEREFOR
Filed Dec. 9, 1959

INVENTORS
FRED R. WILHELM,
EDMUND GREGORCZIK AND
HENRY L. MEYER
BY
Teare, Kramer, Sturges & Felzer
ATTORNEYS United States Patent Office 3,064,681
Patented Nov. 20, 1962

3,064,681
HYDRAULIC CONTROL SYSTEM AND HYDRAU-
LIC CONTROL VALVE THEREFOR
Fred R. Wilhelm and Edmund Gregorczik, Willowick,
and Henry L. Meyer, Cleveland Heights, Ohio, assignors
to The Cleveland Trencher Company, Cleveland, Ohio,
a corporation of Ohio
Filed Dec. 9, 1959, Ser. No. 858,354
3 Claims. (Cl. 137—621)

This invention relates to a hydraulic control system and hydraulic control valve therefor and more particularly to a hydraulic speed control valve of the type utilized with a variable output pump for regulating the output of the pump in accordance with actuation of the speed valve, and thus optimumly controlling the speed of an associated hydraulic motor unit, without presenting any waste fluid or associated heat problems. The invention is shown and described in the environmental setting of excavating machines with which the hydraulic system and the control valve of the invention is particularly well adapted for use.

It is known in excavating machines to provide a fluid control system for actuating and controlling various hydraulic motor units which in turn actuate and control various components of the excavating machine, to thereby provide a hydraulic powered machine capable of increased usability in excavating operations. Some of the working components of excavating machines which are conventionally actuated and controlled by hydraulic motor units in present day practice are the discharge conveyor of the machine in its shifting movements to various work positions, and for actuating the endless belt of the conveyor for moving the excavated material it receives from the excavating unit of the machine to a side of the excavation. Also in recent practice, the crumbing mechanism for such a machine has been powered by a hydraulic motor to greatly increase the usability of such crumbing mechanism and increase the maneuverability of the excavating machine as a whole.

It is also known to use a variable output pump, such as the well-known plunger-type pump, incorporating a wobble plate, for varying the output of the pump, and for using such a variable output pump in conjunction with a variable orifice speed valve operatively coupled to the pump by various conduit lines, including a pilot line, so that the discharge pressure at the outlet end of the speed valve is sensed by the pump and automatically controls the eccentricity or tilt of the wobble plate, to thus automatically coordinate the output of the variable volume pump with the actuation of the speed control valve. As is known in the art, such an arrangement eliminates waste fluid and associated heat problems. In hydraulically actuated and control systems which utilize constant displacement pumps, variation in speed of the associated motor units has to be accomplished by using one or more pumps and bleeding off the unwanted pressurized fluid, with the energy in the by-passed fluid being converted into heat, and thus requiring much larger reservoirs in the fluid system, or some other means, for disposing of the heat produced. The speed control valve in such conventional systems is conventionally coupled to a distributing valve which embodies moveable valve spools which directionally control the distribution of the pressurized fluid from the speed valve to the various motor units in the system, to thereby control the direction of actuation of such motor units.

The usual practice of coupling such a speed control valve into a hydraulic system by the use of conventional, generally flexible, fluid distributing lines, results in a bulky and space consuming arrangement, which particularly in the environmental setting of excavating machines or the like, which are of a relatively compact nature, is completely undesirable, both from a space consumed and maintenance standpoint.

The present invention provides a novel speed control valve which is adapted to be attached directly to a distributing valve which may include one or more individual valve casings and an associated valve spool for each casing, such individual distributing valves being adapted to control the direction of application of fluid pressure from the speed valve to the respective motor unit. Such an arrangement completely eliminates exterior hose connections between the speed valve and the distributing valves in the system, and provides a much more compact and maintenance free arrangement, and greatly increases the efficiency and workability of the machine operator, thus materially increasing the usability and efficiency of the excavating machine.

Accordingly, an object of the invention is to provide an improved speed or volume control valve for use in a hydraulic system which includes a variable output pump and distributing valve means for controlling the application of pressurized fluid to one or more hydraulic powered motor units in the system.

Another object of the invention is to provide a speed valve of the latter type which is adapted for direct mounting with the directional control valve of the system, to thereby reduce the number of fluid distributing conduits and minimizing the number of fittings and hose assemblies, to provide a much more compact and maintenance-free arrangement.

A further object of the invention is to provide a valve of the above type which is particularly adapted for use in a hydraulic system for embodiment in an excavating machine, to increase the compactness of the system and provide the latter with optimum usability in an excavating machine environment.

A still further object of the invention is to provide a hydraulic actuating and control system for an excavating machine, which includes a plurality of hydraulic motor units for actuating and controlling various working components of the machine, together with a variable output pump and a directional control valve bank to which is directly attached a speed or volume control valve in a compact, economical arrangement, which minimizes the number of fittings and hose connections in the system and increases the economic desirability of the excavating machine as a whole.

Other objects and advantages of the invention will be apparent from the following description taken in conjunction with the accompanying drawings wherein:

FIG. 1 is a side elevational view of an excavating machine embodying the instant invention therein;

FIG. 2 is an enlarged, fragmentary, generally perspective view illustrating the directional control valve bank for controlling the direction of application of pressurized fluid to various motor units utilized in the excavating machine, together with the volume or speed control valve attached directly to such directional control valve bank; FIG. 2 is a view taken from the opposite side of the excavating machine as that illustrated in FIG. 1;

FIG. 5 is a vertical sectional view of the speed control valve taken from substantially along the plane 5—5 of FIG. 4, looking in the direction of the arrows, and illustrating the internal structure of the speed control valve;

FIG. 6 is a side elevational, detailed view of the slotted rotary spool for the speed control valve of FIGS. 3, 4 and 5;

FIG. 7 is an end elevational view of the valve spool for the volume control valve and is taken substantially from the left hand end of FIG. 6;

Figure 1:
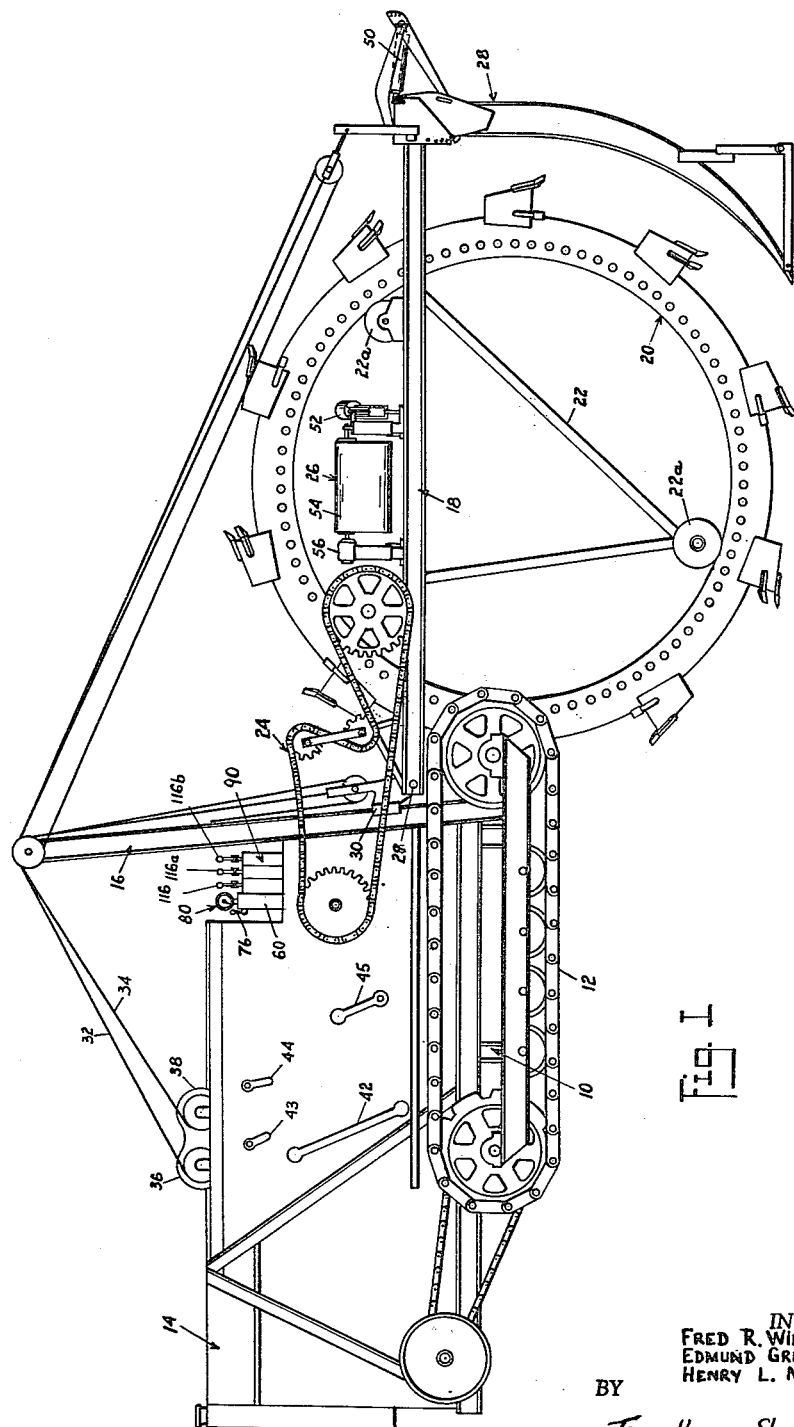
Figure 2:
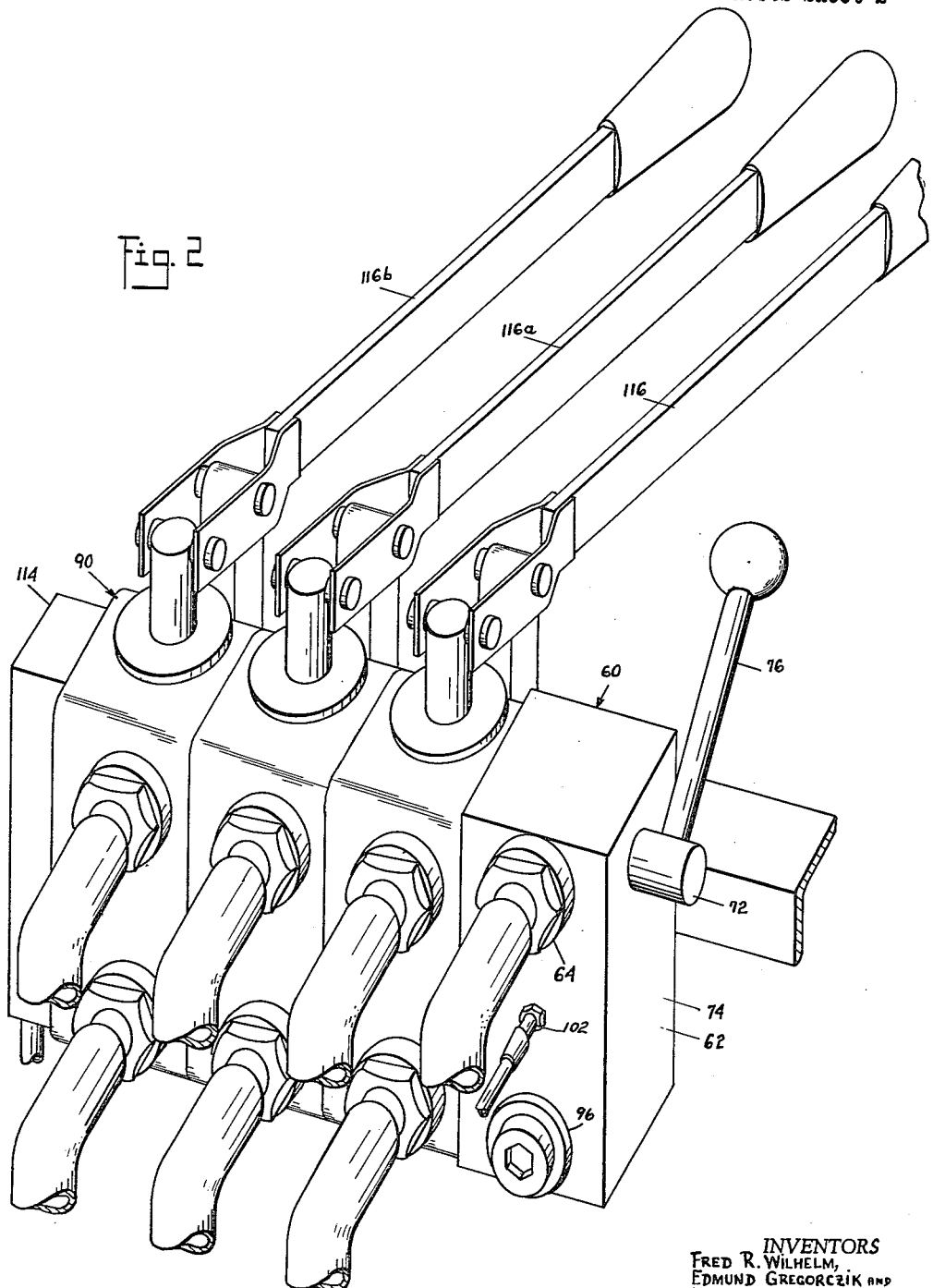
Figures 3, 4:
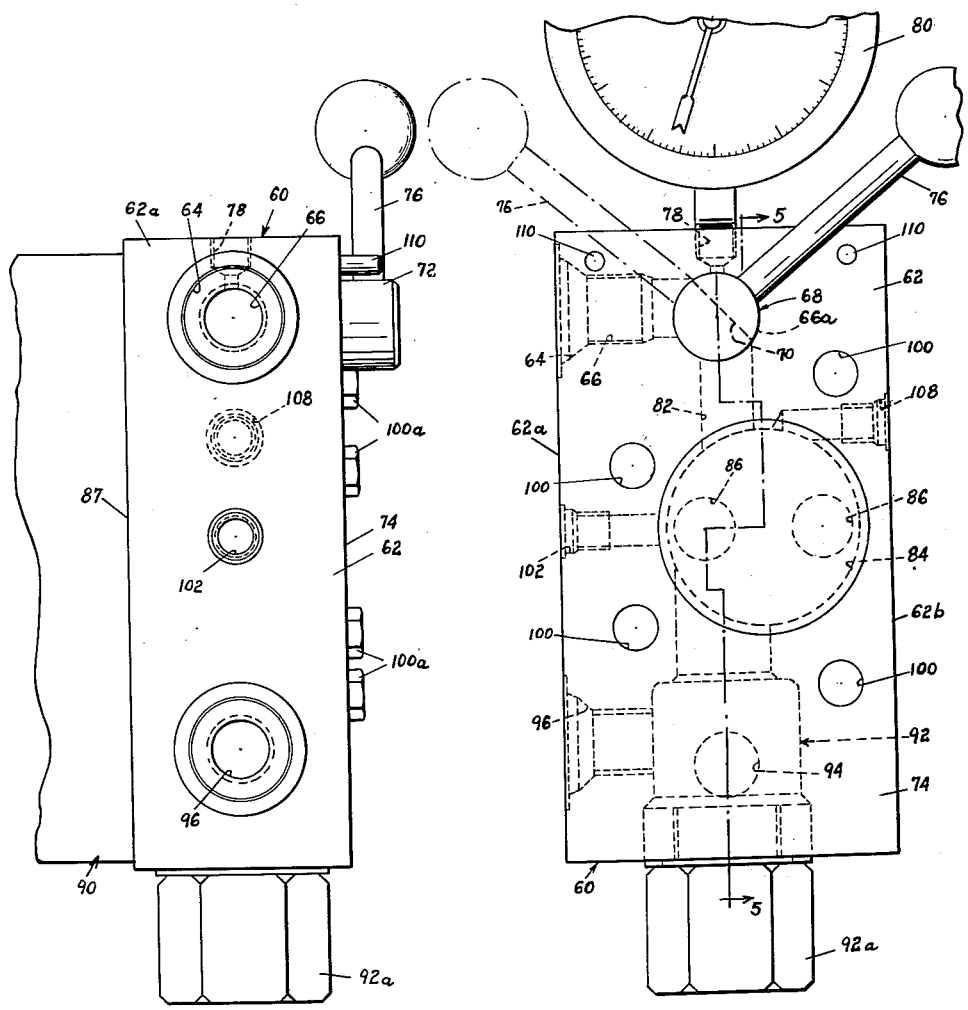
FIG. 3 is a side elevational view of the speed or volume control valve showing the same in attached or mounted position with the directional control valve of the hydraulic system, such directional control valve being only partially shown and in diagrammatic form.
FIG. 4 is a end elevational view of the speed or volume control valve of FIG. 3 and taken substantially from the right hand end of FIG. 3; the attaching bolts which mount the speed valve to the directional control valve have been eliminated in the FIG. 4 showing.

Referring now again to the drawings and in particular to FIG. 1 thereof, there is illustrated an excavating machine embodying the instant invention. Such an excavating or trenching machine broadly comprises a main frame 10 supported on suitable tractor treads 12, a main power plant or internal combustion engine 14 supported on the forward end of frame 10, a structure 16 for supporting a vertically movable boom structure 18, an excavating wheel or unit 20 rotatably mounted on boom structure 18 by means of frame and wheel arrangement 22 and 22a, and drivingly connected to motor unit 14 of the machine by the chain and sprocket arrangement generally referred to by reference No. 24, a transversely extending discharge conveyor 26 which is adapted to receive material from digging unit 20 and carry it to either side of the machine, and a crumbing shoe device 28 pivotally connected to the outer end of the boom 18 and when in operative position extending downwardly therefrom in generally co-planar relation with the digging unit. Boom structure 18 is pivotally connected as at 29 to carriage elements 30 for movement in a generally vertical plane and may be raised and lowered on structure 16 by means of such carriage elements. Carriage elements 30 and attached boom 18 are actuated by cable and pulley systems 32, 34 actuated by winding drums 36, 38 mounted on the machine frame and in a manner well known in the art. It will be understood that other structural arrangements and systems could be utilized for controlling the movement of the boom 18 and associated digging unit 20 without departing from the scope of the invention. The controls for operating the various components of the machine including the aforementioned main power plant, the winding drums 36, 38, the digging unit 20 etc., may include the levers 42, 43, 44 and 45 as shown, with the latter being localized in a particular area on the machine and in the vicinity of the machine operator's work station, for convenient access by the machine operator.

The crumbing shoe may be readily raised and lowered by a hydraulic powered motor unit 50 operatively attached thereto. Reference is made to the United States Patent No. 3,022,584 of Henry L. Meyer et al., issued February 27, 1962, for a detailed showing of an arrangement for power operating a crumbing mechanism of an excavating machine. The conveyor may be shifted transversely with respect to the digging unit by means of a hydraulic powered motor unit 52 operatively coupled thereto. Reference is made to the United States Patent No. 2,981,013 of Albert R. Askue, issued April 25, 1961, for a detailed showing of an arrangement for power shifting a discharge conveyor of an excavating machine by means of a fluid powered motor unit. The belt 54 of the discharge conveyor may be driven by means of a reversible rotary type hydraulic motor unit 56 mounted at one end of the conveyor in a manner well known in the art. Each of the said hydraulic motor units are suitably connected by means of feed and return lines to a source of pressurized fluid mounted on the machine chassis and in a manner hereinafter to be described in greater detail.

Valve means is provided for controlling the flow of pressurized fluid to the aforementioned hydraulic motor units, and in accordance with the invention one of such valve means is a speed or volume control valve 60. Referring now in particular to FIGS. 2, 3, 4 and 5, valve 60 comprises a housing or casing 62. One side 62a of such casing is provided with a pressurized fluid inlet port 64 which communicates with a generally horizontally extending passageway 66 in the valve casing. Passageway 66 opens into valve spool chamber 66a in which is disposed in relatively closely fitting rotatable relation the slotted plug or spool element 68 of the valve 60. Grooves 69 are disposed on opposite sides of slot 70 in the plug member 68, and are adapted to receive therein O-ring sealing elements 69a (FIG. 5) for resisting leakage of fluid axially of the plug member 68. One end 72 of plug 68 extends exteriorly of the outer end surface 74 of the speed control valve, and mounts an actuating handle element 76 thereon for rotating the plug member 68 and thus controlling the flow of pressurized fluid through the valve 60.

A pressure gage port 78 extends downwardly from the top surface of valve 60 and communicates with the plug chamber 66a. As can be best seen from FIG. 4 and in accordance with the invention, the location of the gage port 78 is such that it is always generally blocked from direct contact with the fluid coming through inlet port 64 by the close fitting spool 68. Thus pressure fluctuations are effectively dampened for more accurate gage readings, and the gage member 80 which is mounted in communicating relation with pressure gage port 78 is protected from surge pressures.

Passageway 82 extends downwardly from the spool chamber 66a and communicates with enlarged chamber 84 in the valve casing. It will be seen therefore that the pressurized fluid from inlet port 64, through spool 68, to chamber 84, is around a 90° bend or angle. One or more fluid pressure exit ports 86 are provided opening onto the inner end surface 87 of the valve casing, such ports being in fluid passing communication with chamber 84 and being adapted to communicate with an inlet pressure port 88 (FIG. 5) in the directional control valve means 90. Disposed below chamber 84 is an adjustable pressure relief valve section 92 of any suitable and conventional construction for limiting maximum operating pressure in the speed valve. The pressure relief mechanism which as shown is of the known cartridge type, is adjustable as by means of rotary portion 92a and included is a fluid exit port 94 (FIG. 5) which opens onto the inner end surface 87 of the valve casing, and is adapted for coupling with pressure relief passageway A in the directional control valve bank 90; an auxiliary fluid exit port 96 is also provided which opens onto side surface 62a of the speed valve casing and which is adapted for coupling by means of a drain line 98 (FIG. 8) to the reservoir 99 in the hydraulic system. Auxiliary exit port 96 is adapted for use if and when the pressure relief to the reservoir through the directional control valve bank is non-existent or is blocked. The valve body of the speed control valve is provided with a plurality of through openings 100 (FIG. 4) which are adapted to receive bolts 100a (FIG. 3) or the like therethrough for attaching the speed or volume control valve directly to the directional control valve bank, thereby eliminating any exterior lines and minimizing the number of fittings and hose connections of the speed valve in the hydraulic system. In this connection O-ring sealing elements 101 (FIG. 5) coact between the directional control bank 90 and the inner side 87 of the speed control valve 60 in circumscribing relation to the respective communicating passageways in the valve members (i.e. ports 86, 94 in the speed valve and passageway 88 and A in the directional valve) to provide a good fluid sealing relation between the valve members. The valve body 62 is also provided with port 102 in side surface 62a and which is adapted for connection as by means of a pilot line 104 (FIG. 8) back to the pump 106 of the system so that as the slotted plug member 68 of the speed valve is rotated to increase or decrease the connecting slotted passageway 70 with the passageways 66 and 82 in the valve body, the discharge pressure in chamber 84 is sensed through the pilot line, as for instance by a spring loaded plunger in the pump and in a manner known in the art, to automatically control the eccentricity or tilt of the wobble plate of the pump and thereby increase or decrease the volume of fluid discharged by the pump in conjunction with actuation of the speed valve. It will be seen therefore, that the actuation of the speed valve is automatically translated into a control signal for automatically coordinating the output of the variable volume pump with the actuation of the speed valve, thereby eliminating waste fluid, and associated heat problems in the hydraulic system. An auxiliary pilot line port 108 is provided in fluid communicating relation with chamber 84 and opening onto the other side surface 62b of the speed valve body for alternative connection with pilot line 104. It will be understood of course that only one of ports 102, 108 is used at one time with the other being suitably closed, as by means of a threaded plug or the like. Abutments 110 are provided on the speed valve casing adapted for engagement with the handle portion of the control lever of the valve for limiting the rotation of spool 68 and thus defining the maximum open and closed positions of the spool of the speed valve. Directional control valve bank 90 may be provided with auxiliary vent passageway B (FIG. 5) therethrough communicating with the exit port and associated drain line of the directional control valve. Thus any fluid seeping past sealing elements 69a and axially inwardly of the spool 68 of the speed valve is effectively returned to the reservoir and through the directional control valve.

Figure 8:
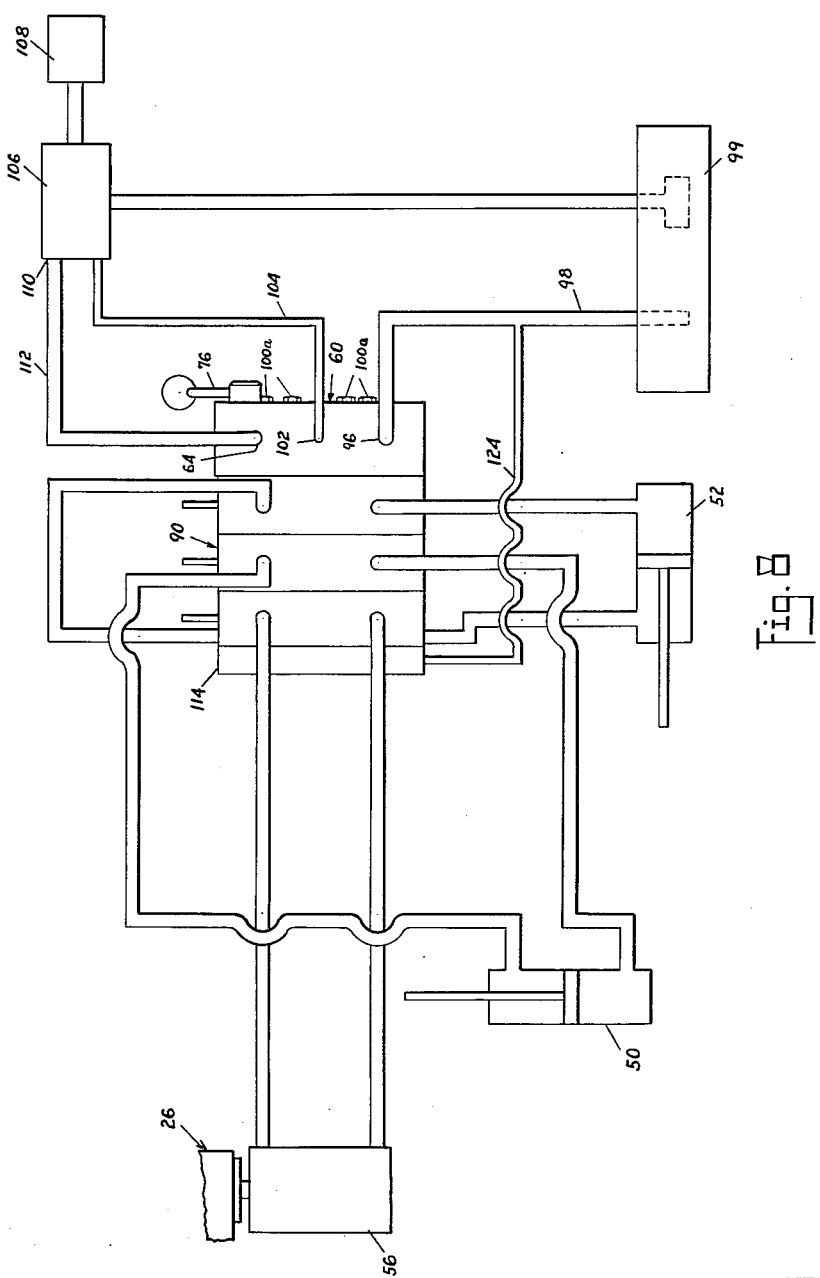
FIG. 8 is a schematic illustration of a hydraulic system in which the aforementioned control valve is embodied together with a directional control valve bank, a plurality of hydraulically powered motor units and a variable output pump, and a system particularly adapted for use in an excavating machine environment.

Referring now to FIG. 8, there is more or less schematically illustrated a fluid system embodying the aforediscussed speed valve, and a system particularly well adapted for use in the environmental setting of an excavating machine, for controlling and actuating various working components of the machine as aforediscussed. Such a system includes the variable output pump 106 which may be suitably coupled to a driving motor unit 108, the latter in an excavating machine environment possibly being the prime mover or engine of the machine proper. The output port 110 of pump 106 may be connected as by means of feed line 112 to the pressure inlet port 64 in the speed valve. The pilot line port 102 (or the other pilot line port 108) in the speed valve is connected by pilot line 104 back to the pump, to automatically coordinate the output of the variable volume pump with the actuation of operating handle 76 of the speed valve. The speed valve is directly mounted on the directional control valve bank 90 as by means of bolts 100a extending through openings 100 in the valve casing 62. The directional control valve is preferably of the well known multiple or bank, open center parallel circuit type including a conventional pressure relief section 114, well known in the art, for controlling the direction of flow of pressurized fluid from the juxtaposed speed valve to various fluid powered motor units. Each valve section of the directional control valve bank includes an axially movable spool or valve member which is adapted for actuation by the machine operator in the conventional manner and as by means of handle elements 116, 116a and 116b (FIG. 2) to connect the fluid distributing ports of each directional control valve section with the respective motor unit. Such motor units as aforementioned may include double acting reciprocal motor unit 52 for moving the conveyor of an excavating machine transverse of the digging unit thereof, a double acting reciprocal motor unit 50 for actuating the crumbing shoe of an excavating machine, and a reversible rotary motor unit 56, for driving the endless belt of the conveyor. Directional control valve means 90 and associated pressure relief section 114 may be connected back to the reservoir 99 and as by way of drain line 124. From FIG. 8, it will be seen that the arrangement provides a compact hydraulic control system utilizing a minimum of fittings and connecting conduits, and one adapted for optimum usability in an excavating machine environment.

From the foregoing description and accompanying drawings, it will be seen that the invention provides an improved speed or volume control valve including a pressure relief section, for use in a hydraulic system and one which is adapted for mounting directly with, or on, a directional control valve in the system, for minimizing the number of fittings and hose assemblies in the system, and providing a much more compact arrangement. It will also be understood that the invention provides a novel arrangement of hydraulic actuated and control system particularly adapted for use on an excavating machine, and which includes a plurality of hydraulically powered motor units for actuating and controlling various working components of the machine, together with a variable output pump and a directional control valve to which is directly attached the speed valve in the aforementioned compact arrangement.

The terms and expressions which have been employed are used as terms of description and not of limitation and there is no intention in the use of such terms and expressions of excluding any equivalents of any of the features described or shown or portions thereof, and it is recognized that various modifications are possible within the scope of the invention claimed.

We claim:

1. In combination, a directional control valve having a valve recess with a slidable valve member therein for controlling the direction of flow of pressurized fluid through said valve for controlling the direction of actuation of a fluid powered motor unit, a fluid pressure inlet port in said valve, and a variable orifice volume control valve secured directly to said directional control valve, said volume control valve comprising a housing having a pair of spaced openings therein, one of said openings being an externally accessible fluid pressure inlet port adapted for coupling to a source of pressurized fluid, and the other of said openings being a fluid pressure outlet port, said fluid pressure outlet port being disposed in juxtaposed fluid passing relation with respect to the pressure inlet port of said directional control valve, an internal passage connecting said openings, a slotted cylindrical-like spool disposed in close fitting but rotatable relation in said passage, one end of said spool extending exteriorly of said housing, an operating handle operably connected to said one end of said spool for rotating said spool and thus varying the amount of flow of pressurized fluid through the slot in said spool, pressure relief valve means disposed in said housing and coacting with said passage to limit the pressure of fluid in said volume control valve to a predetermined value, a pressure relief port in said housing communicating with said pressure relief means for venting said volume control valve on actuation of said pressure relief means, and means on said housing detachably securing said volume control valve directly to said directional control valve for mounting thereon in covering relation to said inlet port of said directional control valve.

2. The combination of claim 1, wherein said directional control valve comprises a pressure relief passageway therethrough, said pressure relief port in said volume control valve housing being disposed in juxtaposed fluid pressure communicating relation with the last mentioned pressure relief passageway for venting fluid pressure from said volume control valve through said directional control valve upon actuation of said pressure relief means.

3. The combination in accordance with claim 2, wherein said volume control valve comprises an auxiliary pressure relief port communicating with said pressure relief means for venting said volume control valve upon actuation of said pressure relief means and when said pressure relief passageway through said directional control valve is blocked.

References Cited in the file of this patent

UNITED STATES PATENTS

| | | | |
|---|---|---|---|
| 766,697 | Hummell | Aug. 2, | 1904 |
| 1,991,227 | Proctor et al. | Feb. 12, | 1935 |
| 2,261,444 | Neubert | Nov. 4, | 1941 |
| 2,433,471 | Mayer | Dec. 30, | 1947 |
| 2,663,150 | Dolch | Dec. 22, | 1953 |
| 2,751,932 | Stueland | June 26, | 1956 |
| 2,772,694 | Simmons | Dec. 4, | 1956 |
| 2,777,426 | Steele | Jan. 15, | 1957 |
| 2,841,960 | Holan et al. | July 8, | 1958 |
| 2,856,960 | Stacey | Oct. 21, | 1958 |
| 2,946,144 | Anderson | July 26, | 1960 |
| 2,955,577 | Zajac | Oct. 11, | 1960 |
| 3,001,547 | Brumbaugh | Sept. 26, | 1961 |